(12) United States Patent
Su et al.

(10) Patent No.: US 9,084,254 B2
(45) Date of Patent: Jul. 14, 2015

(54) METHOD AND DEVICE FOR TRANSMITTING DOWNLINK CONTROL INFORMATION

(75) Inventors: Xin Su, Beijing (CN); Ranran Zhang, Beijing (CN); Meifang Jing, Beijing (CN); Rakesh Tamrakar, Beijing (CN)

(73) Assignee: CHINA ACADEMY OF TELECOMMUNICATIONS TECHNOLOGY, Beijing (CN)

( * ) Notice: Subject to any disclaimer, the term of this patent is extended or adjusted under 35 U.S.C. 154(b) by 0 days.

(21) Appl. No.: 14/238,839

(22) PCT Filed: Aug. 22, 2012

(86) PCT No.: PCT/CN2012/080443
§ 371 (c)(1),
(2), (4) Date: Jul. 3, 2014

(87) PCT Pub. No.: WO2013/029482
PCT Pub. Date: Mar. 7, 2013

(65) Prior Publication Data
US 2014/0313994 A1    Oct. 23, 2014

(30) Foreign Application Priority Data

Sep. 1, 2011   (CN) .......................... 2011 1 0257228

(51) Int. Cl.
*H04W 4/00* (2009.01)
*H04W 72/04* (2009.01)
(Continued)

(52) U.S. Cl.
CPC ........... *H04W 72/042* (2013.01); *H04L 1/0041* (2013.01); *H04L 5/0048* (2013.01); *H04L 5/0051* (2013.01); *H04B 7/0417* (2013.01)

(58) Field of Classification Search
None
See application file for complete search history.

(56) References Cited

U.S. PATENT DOCUMENTS

| | | | |
|---|---|---|---|
| 2010/0074350 A1* | 3/2010 | Malladi et al. | 375/260 |
| 2013/0021991 A1* | 1/2013 | Ko et al. | 370/329 |
| 2013/0250863 A1* | 9/2013 | Nogami et al. | 370/328 |

FOREIGN PATENT DOCUMENTS

| | | |
|---|---|---|
| CN | 101764642 A | 6/2010 |
| CN | 102076076 A | 5/2011 |

(Continued)

OTHER PUBLICATIONS

International Search Report and Written Opinion for PCT/CN2012/080443.

(Continued)

*Primary Examiner* — Otis L Thompson, Jr.
(74) *Attorney, Agent, or Firm* — Kilpatrick Townsend & Stockton LLP

(57) ABSTRACT

Disclosed in the invention are a method and a device for transmitting downlink control information (DCI). The method comprises: processing the downlink control information to generate downlink control information code words; scrambling and modulating the downlink control information code words in turn to generate a modulation symbol sequence; mapping the modulation symbol sequence to v data layers, wherein v is an integer which is more than or equal to 1; mapping modulation symbols on the v data layers to a demodulation reference signal (DMRS) antenna port; and mapping the modulation symbols on the DMRS antenna port to a physical antenna and sending to user equipment (UE). According to the method and the device of the invention, multi-layer data transmission can be supported, the transmission mode is more flexible, and transmission efficiency is higher.

16 Claims, 2 Drawing Sheets

(51) Int. Cl.
*H04L 1/00* (2006.01)
*H04L 5/00* (2006.01)
*H04B 7/04* (2006.01)

(56) References Cited

FOREIGN PATENT DOCUMENTS

| CN | 102158302 A | 8/2011 |
|---|---|---|
| CN | 102299769 A | 12/2011 |
| EP | 2 296 293 A2 | 3/2011 |
| WO | 2010/079728 A1 | 7/2010 |
| WO | 2010090442 A2 | 8/2010 |

OTHER PUBLICATIONS

The extended European search report for counterpart European application 12826893.5, issued on Jun. 5, 2014, 8 pages.
ERICSSON et al: "Enhancements for UE specific control signaling", 3GPP Draft; R1-111332 Enhancements for UE Specific Control Signaling, 3rd Generation Partnership Project (3GPP), Mobile Competence Centre ; 650, Route Des Lucioles ; F-06921 Sophia-Antipolis Cedex ; France, vol. RAN WG1, no. Barcelona, Spain; May 9, 2011, May 3, 2011, XP050491058, [retrieved on May 3, 2011].

* cited by examiner

METHOD AND DEVICE FOR TRANSMITTING DOWNLINK CONTROL INFORMATION

The present application is a US National Stage of International Application No. PCT/CN2012/080443, filed 22 Aug. 2012, designating the United States, and claiming priority to Chinese Patent Application No. 201110257228.5, filed with the State Intellectual Property Office of China on Sep. 1, 2011 and entitled "Method and device for transmitting downlink control information", which is hereby incorporated by reference in its entirety.

FIELD OF THE INVENTION

The present invention relates to the field of wireless communication and particularly to a method and a device for transmitting downlink control information.

BACKGROUND OF THE INVENTION

Physical Downlink Control Channel (PDCCH) is used for transmission of scheduling indicator, resource allocation indicator, transmission mode indicator and other L1/L2 control information in Long Term Evolution (LTE). In the earlier releases (Releases 8/9/10 or Rel 8/9/10) of LTE, PDCCH is multiplexed with Physical Downlink Shared Channel (PDSCH) through Time Division Multiplexing (TDM) so that PDCCH occupies first 1-4 Orthogonal Frequency Division Multiplexing (OFDM) symbol(s) of each downlink sub-frame. The particular number of occupied symbols depends upon the amount of control information carried over PDCCH, bandwidth of the system and type of the sub-frame.

In LTE Rel8/9/10, PDCCH is transmitted based upon a Cell-Specific Reference Signal (CRS). When the number of CRS ports is 1, PDCCH is transmitted via a single port, port 0; when the number of CRS ports is 2, PDCCH is transmitted through Space-Frequency Block Coding (SFBC); and when the number of CRS ports is 4, PDCCH is transmitted through the combination of Space-Frequency Block Coding (SFBC) and Frequency Switched Transmit Diversity (FSTD).

Along with further evolution of transmission technology and expansion of network deployment, there is a new requirement by the LTE system for transmission of downlink control information, and the original PDCCH mechanism also has conic to suffer from numerous problems as follows.
1) Capacity Demand With an increasing number of users, a plurality of User Equipments (UEs) need to be scheduled concurrently, particularly in Multi-User Multiple Input Multiple Output (MU-MIMO) and Coordinated Multi-Point Transmission/Reception (CoMP). In the course of scheduling Rel-10 or higher-release UE, Downlink Control Information (DCI) format 2C or downlink control information format at a higher overhead is largely used.

Considering of controlling CRS overhead, a system subsequent to the Rel-10 is largely configured with a Multimedia Broadcast Single Frequency Network (MBSFN) sub-frame in which there are at most two symbols that can be used for transmission of PDCCHs, thus making the capacity of PDCCHs further insufficient.

In Carrier Aggregation (CA), cross-carrier scheduling may be performed by scheduling transmission of a plurality of Component Carriers (CCs) over a PDCCH of one CC, thus making control resources further insufficient.

2) Interference Suppression Problem

With PDCCH and PDSCH multiplexed through TDM, it may be difficult to obviate inter-cell PDCCH interference by allocating resources.

In a Heterogeneous Network (HetNet) scenario, Home eNodeB (HeNB) and other nodes are usually deployed without reasonable network design, and interference between PDCCHs may become more serious.
3) Coverage Extension Demand Along with expansion of LTE network deployment, the coverage of the LTE system will be extended gradually from the urban area to the suburb and the exurb and even to the countryside, so the edge coverage capability of the control channel needs to be taken into account; and in the CoMP, the UE tends to be located at the boundary of a cell, and a better edge coverage capability of the control channel is also desired.

For the UE at the edge of a cell, PDCCHs tend to be aggregated at a her level, thus the capacity of PDCCHs will be more limited.

4) Influence Due to an Increasing Number of Antennas

Only 4 antenna ports at most can be supported in LTE Rel-8/9, and at most 8 antenna ports can be supported in LTE Rel-10 specification. Along with expansion of LTE network deployment, the number of antennas at the system side will also be upgraded gradually from single-antenna configuration mode to 2, 4 or 8-antenna configuration mode. With an increasing number of antennas, a more flexible multi-antenna transmission method can be used with PDSCH, and PDCCH can only be transmitted based upon a single port or transmit diversity of 1/2/4 CRS port. Considering of controlling CRS overhead, it is very likely for the Rel-10 and later releases to configure only two CRS ports. In this case, transmission performance of the PDCCH may be further insufficient.

With an increasing number of antennas, a CRS needs to be mapped to a real antenna port through antenna virtualization. In order to ensure a sector direction to be covered effectively by sector shaping as a result of weighted integration of a plurality of array elements, some constraint needs to be put on the design of the array elements and the selection of a weighting vector. In this case, the sector shaping as a result of virtualization may have an adverse influence on the coverage at the edge.

As can be apparent, the existing PDCCH can only be transmitted at a single CRS-based layer, thus the efficiency of transmission is limited; it is very likely for the Rel-10 and later releases to configure only two CRS ports, and in this case, PDCCH can only be transmitted through SFBC, thus the efficiency of transmission will be more limited; and the process of mapping a CRS port to a physical antenna through antenna virtualization may have an adverse influence upon the coverage at the edge of the PDCCHs.

SUMMARY OF THE INVENTION

The invention provides a method and device for transmitting downlink control information so as to address the problem in the prior art with single-layer CRS port-based transmission.

The invention provides a method for transmitting downlink control information, which includes:
  processing the downlink control information to generate downlink control information codewords;
  scrambling and modulating the downlink control information codewords sequentially to generate a sequence of modulated symbols;
  mapping the sequence of modulated symbols onto v data layers, wherein v is an integer more than or equal to 1;

mapping the modulated symbols on the v data layers to Demodulation Reference Signal, DMRS, antenna ports; and mapping the modulated symbols on the DMRS antenna ports onto physical antennas and sending to a User Equipment, UE.

The invention further provides a method for transmitting downlink control information, which includes:

receiving a signal transmitted from the network side over physical antennas and mapping the signal onto Demodulation Reference Signal, DMRS, antenna ports to obtain modulated symbols;

mapping the modulated symbols on the DMRS antenna ports to v data layers, wherein v an integer more than or equal to 1;

mapping the modulated symbols on the v data layers to a sequence of modulated symbols;

demodulating and descrambling the sequence of modulated symbols sequentially to obtain downlink control information codewords; and processing the downlink control information codewords to obtain the downlink control information.

The invention provides a device for transmitting downlink control information, which includes:

a preprocessing unit configured to process the downlink control information to generate downlink control information codewords;

a scrambling and modulating unit configured to scramble and modulate the downlink control information codewords sequentially to generate a sequence of modulated symbols;

a first mapping unit configured to map the sequence of modulated symbols onto v data layers, wherein v is an integer more than or equal to 1;

a second mapping unit configured to map the modulated symbols on the v data layers to Demodulation Reference Signal, DMRS, antenna ports; and a third mapping unit configured to map the modulated symbols on the IRS antenna ports onto physical antennas and to send to a User Equipment, UE.

The invention further provides a device for transmitting downlink control information, which includes:

a first mapping unit configured to receive a signal transmitted from the network side over physical antennas and to map the signal onto Demodulation Reference Signal, DMRS, antenna ports to obtain modulated symbols;

a second mapping unit configured to map the modulated symbols on the DMRS antenna ports to v data layers, wherein v is an integer more than or equal to 1;

a third mapping unit configured to map the modulated symbols on the v data layers to a sequence of modulated symbols;

a demodulating and descrambling unit configured to demodulate and descramble the sequence of modulated symbols sequentially to obtain downlink control information codewords; and a processing unit configured to process the downlink co information codewords to obtain the downlink control information.

With the method and device for transmitting downlink control information provided by the invention, there are the following advantageous effects: the use of DMRS port-based transmission and multi-layer mapping can greatly reduce occupied resources to thereby extend the capacity of PDCCHs, and DMRS transmission is a transmission method for a single UE, so even a user equipment at the edge can be well covered to thereby satisfy a demand for extending coverage; and a demand for at most 8 antennas can be supported.

DETAILED DESCRIPTION OF THE EMBODIMENTS

A method and device for transmitting downlink control information according to the invention will be described below in further details with reference to the drawings and the embodiments.

Figure 1:
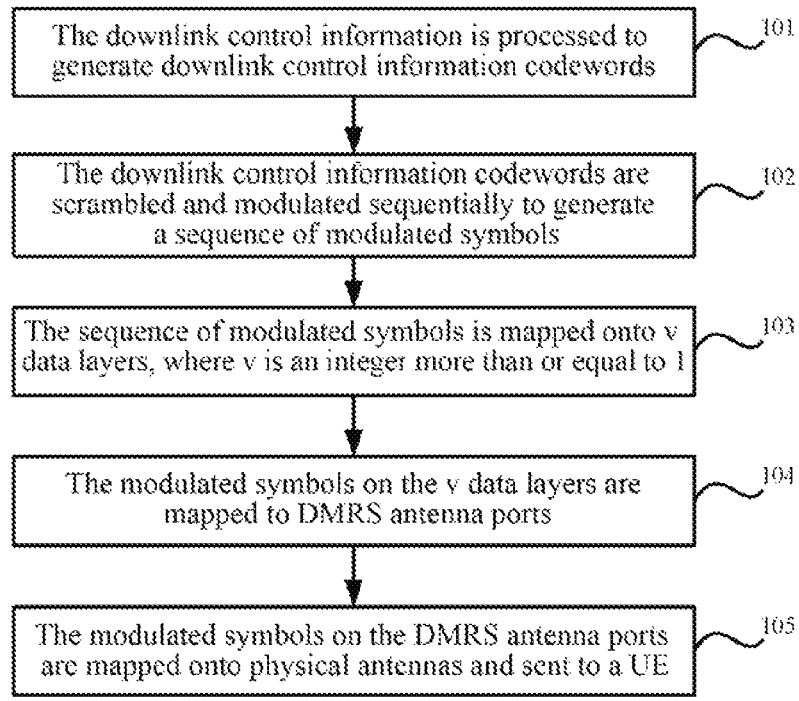
FIG. 1 is a flow chart of a method for transmitting downlink control information according to an embodiment of the invention.

As illustrated in FIG. 1, a method for transmitting downlink control information according to an embodiment of the invention includes the following steps.

Step 101, the downlink control information is processed to generate downlink control information codewords.

The process here is primarily to add some redundancy check info nation, perform channel encoding, etc.

Step 102, the downlink control information codewords are scrambled and modulated sequentially to generate a sequence of modulated symbols.

A fixed modulation scheme can be adopted, for example, Quadrature Phase Shift Keying (QPSK), or a modulation scheme can be determined as needed.

Step 103, the sequence of modulated symbols is mapped onto v data layers, where v is an integer more than or equal to 1.

Step 104, the modulated symbols on the v data layers are mapped to Demodulation Reference Signal (DMRS) antenna ports.

Step 105, the modulated symbols on the DMRS antenna ports are mapped onto physical antennas and sent to a User Equipment (UE), particularly to the UE over a PDCCH.

In the method for transmitting downlink control information according to the embodiment of the invention, the information is transmitted based upon the DMRS ports which support multi-layer transmission of data, so in the embodiment of the invention, the downlink control information to be transmitted can be transmitted to the UE through multi-layer transmission in the case of insufficient resources and through single-layer transmission in the case of sufficient resources or a low amount of data, thus enabling more flexible transmission. Multi-layer transmission can be performed in the case of a high amount of data and insufficient resources to thereby occupy a lower amount of resources and consequently improve the capacity of PDCCHs; and moreover transmission via the DMRS ports is transmission for a single UE unlike CRS-based broadcast transmission, so even a user equipment the edge can be well covered to thereby satisfy a demand for extending coverage; and the DMRS ports can support transmission over at most 8 antennas to thereby satisfy a demand of an LTE system for multi-antenna transmission.

Preferably, in the embodiment of the invention, the particular DMRS antenna ports for use are determined by the number of DMRS antenna ports supported by the UE, and the number v of data layers for use in mapping is determined by a channel condition of the UE, where v is determined to be no more than the number of DMRS antenna ports supported by the UE.

Preferably, in the step 101, the downlink control information is processed as follows:

- A Cyclic Redundancy Check (CRC) code is added into the downlink control information; and
- Channel encoding and rate matching are performed on the downlink control information with the CRC code added thereto to generate the downlink control information codewords which are represented in the embodiment as b(0), . . . , b ($M_{bit}$−1), where $M_{bit}$ is the total number of downlink control information codewords.

The foregoing process is known in the art and will not be detailed again here, and of course, the downlink control information codewords may alternatively be generated in other processes.

Preferably, in the step S102, the downlink control information codewords are scrambled as follows:

- The downlink control information codewords are scrambled at a bit level by a pseudorandom sequence c(i) as follows:
- $\tilde{b}(i)=(b(i)+c(i))\mod 2$, wherein i=0, . . . , $M_{bit}$−1, b(i) is a downlink control information codeword, and $M_{bit}$ is the total number of downlink control information codewords.

Of course, they may alternatively be scrambled in other ways.

Preferably, in the step 102, the scrambled downlink control information codewords are modulated as follows.

The modulation scheme is determined according to the channel condition of the UE, and the scrambled downlink control information codewords are modulated in the determined modulation scheme, and since the channel condition of the UE is taken into account in the modulation scheme, the transmission efficiency can be improved while ensuring the transmission reliability.

Particularly, the sequence of modulated symbols generated after modulation is a sequence of complex modulated symbols, and in the embodiment, the sequence of modulated symbols generated after modulation is represented as d(0), . . . , d ($M_{symbol}$−1), where $M_{symbol}$ is the total number of modulated symbols in the sequence of modulated symbols.

Preferably, in the step 103, the sequence of modulated symbols d(0), . . . , d ($M_{symbol}$−1) is mapped onto the v data layers as follows.

The sequence of modulated symbols is mapped onto the v data layers in a preset first mapping scheme so that numbers of modulated symbols at each data layer are equal.

As described above, after the number v of data layers is determined, the number of modulated symbols at each data layer can be determined by the number of modulated symbols in the sequence of modulated symbols, and the sequence of modulated symbols can be mapped to the plurality of data layers in the preset first mapping scheme, and in this embodiment, the modulated symbols mapped onto the plurality of data layers are represented as x(j)=$[x^{(0)}(j), \ldots, x^{(\upsilon-1)}(j)]^T$, wherein j=0, . . . , $M_{symbol}^{layer}$−1, and $M_{symbol}^{layer}$ represents the total number of modulated symbols at each data layer.

Preferably, in the embodiment, the sequence of modulated symbols is mapped onto the v data layers in the following mapping scheme:

$$\begin{cases} x^{(0)}(j) = d(\upsilon \times j) \\ \vdots \\ x^{(\upsilon-1)}(j) = d(\upsilon \times j + \upsilon - 1), \end{cases}$$

wherein $x^{(l)}(j)$ is a modulated symbol at the l-th data layer, l=0, . . . v−1, j=0, . . . , $M_{symbol}^{layer}$−1, $M_{symbol}^{layer}$ represents the total number of modulated symbols at each data layer, d(k) is the sequence of modulated symbols, k=0, . . . , $M_{symbol}$−1. $M_{symbol}$ is the total number of modulated symbols in the sequence of modulated symbols, and $M_{symbol}^{layer}=M_{symbol}/v$.

Preferably, in the step 104, the modulated symbols on the v data layers are mapped onto the WARS antenna ports as follows:

The modulated symbols on the v data layers are mapped onto the DMRS antenna ports in a preset second mapping scheme according to the number v of data layers and the number of DMRS antenna ports.

As described above, the number v of data layers is no more than the number of DMRS antenna ports, so all the data can be mapped to the DRMS antenna ports under a particular mapping rule which can be determined as needed.

Preferably, the number v of data layers is equal to the number of DMRS antenna ports, and the modulated symbols on the v data layers are mapped to the DMRS antenna ports by the way that the data layers correspond to the DMRS antenna ports in a one-to-one manner.

For the DMRS antenna ports, the value of the number of the DMRS antenna ports $p^{DMRS}$ ranges as $p^{DMRS} \in [1, \ldots, 8]$, and the value of a port number p ranges as $p \in [7, \ldots, 14]$, and in the embodiment of the invention, the modulated symbols as a result of mapping to the DMRS antenna ports are represented as y(j)=$[ \ldots y^{(p)}(j) \ldots ]^T$, where $y^{(p)}(j)$ represents data on a DMRS antenna port p.

If the data layers correspond to the DMRS antenna ports in a one-to-one manner as described above, then the following mapping scheme can be adopted:

$$\begin{cases} y^{(7)}(j) = x^{(0)}(j) \\ \vdots \\ y^{(7+p^{DMRS}-1)}(j) = x^{(\upsilon-1)}(j) \end{cases}$$

wherein $\upsilon = p^{DMRS}$;

thus, the resulted y(j) is a $p^{DMRS} \times M_{symbol}^{layer}$-dimensioned matrix.

Preferably, in the step 105, the modulated symbols on the DRMS antenna ports are mapped onto the physical antennas as follows:

A pre-coding matrix W is selected according to the channel condition of the UE; and The modulated symbols on the DRMS antenna ports are mapped onto the physical antennas in the following mapping scheme:

$\tilde{y}(j)=W \cdot y(j)$, wherein $\tilde{y}(j)$ is a signal on a physical antenna, and y(j) is a modulated symbol on a DMRS antenna port.

$\tilde{y}(j)=W \cdot y(j)$,

W is an Ant×$p^{DMRS}$-dimensioned complex matrix, where Ant is the number of physical antennas, thus resulting in Ant×$M_{symbol}^{layer}$-dimensional data, where a number $M_{symbol}^{layer}$ of modulated symbols are transmitted on each physical antenna.

In the embodiment of the invention, the data mapped onto the physical antennas is represented as $\tilde{y}(j) = [\ldots \tilde{y}^{(Ant)}(j) \ldots]^T$, wherein $\tilde{y}^{(Ant)}(j)$ represents data on an antenna Ant.

Ant may or may not be equal to $p^{DMRS}$, and particular Ant for use is determined by the configuration of an eNB. In the embodiment of the invention, for DMRS port-based mapping, unlike antenna virtualization used in the prior art, the network side device, an evolved NodeB (eNB), can select from pre-coding codebooks a pre-coding matrix matching the channel condition of the UE according to the channel condition of the UE, and the eNB can determine the channel condition of the UE as follows.

1) The UE searches a set of pre-coding codebooks for a pre-coding matrix matching its own channel condition according to the channel condition and feeds it back to the eNB, that is, the eNB determines W for use based upon feedback information of the UE.

2) The UE feeds an uplink signal back to the eNB over an uplink channel, and the eNB determines the channel condition of the UE according to the uplink signal reported by the UE and searches a set of pre-coding codebooks for a pre-coding matrix matching the channel condition, that is, the eNB determines W for use based upon channel reciprocity.

In the embodiment of the invention, downlink control information is transmitted over a PDCCH in a single-codeword multi-layer scheme, and DMRS port-based transmission can support multi-layer transmission of data, thus enabling more flexible transmission and higher transmission efficiency; and in DMRS port-based transmission, mapping of the DMRS ports to the physical antennas can be optimized by a channel condition of each UE without the presence of an edge coverage loss due to sector shaping.

Figure 2:
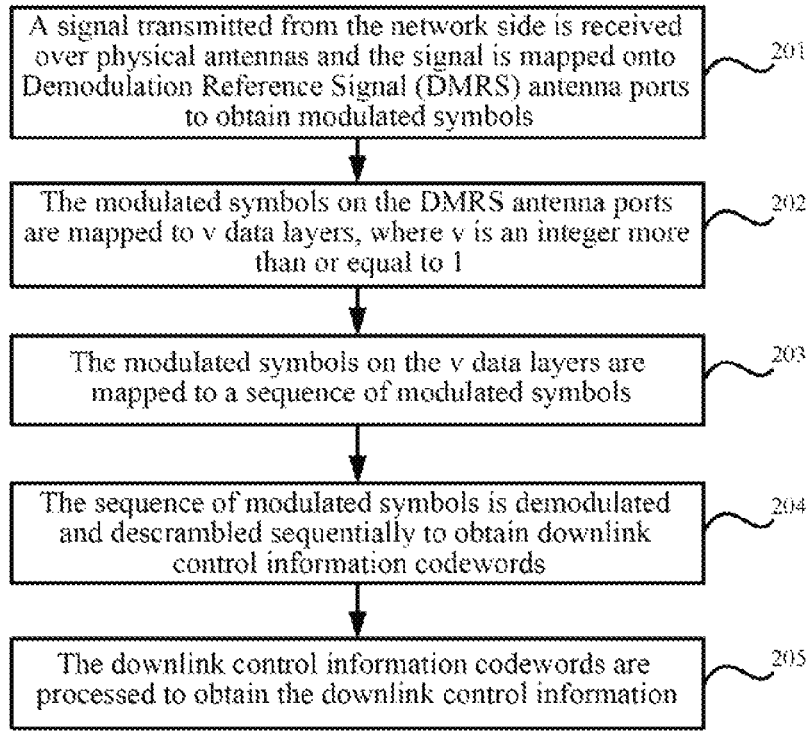
FIG. 2 is a flow chart of another method for transmitting downlink control information according to an embodiment of the invention.

As illustrated in FIG. 2, an embodiment of the invention further provides a method for transmitting downlink control information, the method includes the following steps.

Step 201, a signal transmitted from the network side is received over physical antennas and the signal is mapped onto Demodulation Reference Signal (DMRS) antenna ports to obtain modulated symbols.

Step 202, the modulated symbols on the DMRS antenna ports are mapped to v data layers, where v is an integer more than or equal to 1.

Step 203, the modulated symbols on the v data layers are mapped to a sequence of modulated symbols.

Step 204, the sequence of modulated symbols is demodulated and descrambled sequentially to obtain downlink control information codewords.

Step 205, the downlink control information codewords are processed to obtain the downlink control information.

A particular process thereof is an inverse process of the foregoing transmission process of the downlink control information and will not be detailed again here.

Based upon the same inventive idea, embodiments of the invention further provide devices for transmitting downlink control information, and since these devices address the problem under a similar principle to the methods of transmitting downlink control information, reference can be made to the implementations of the methods for implementations of these devices, and a repeated description thereof will be omitted here.

Figure 3:
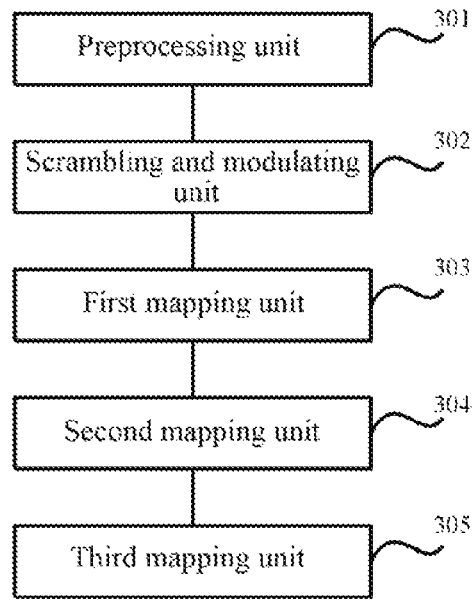
FIG. 3 is a structural diagram of a device for transmitting downlink control information according to an embodiment of the invention.

As illustrated in FIG. 3, an embodiment of the invention provides a device for transmitting downlink control information, which includes:

A preprocessing unit 301 configured to process the downlink control information to generate downlink control information codewords;

A scrambling and modulating unit 302 configured to scramble and modulate the downlink control information codewords sequentially to generate a sequence of modulated symbols;

A first mapping unit 303 configured to map the sequence of modulated symbols onto v data layers, where v is an integer more than or equal to 1;

A second mapping unit 304 configured to map the modulated symbols on the v data layers to Demodulation Reference Signal (DMRS) antenna ports; and A third mapping unit 305 configured to map the modulated symbols on the DMRS antenna ports onto physical antennas and to send to a User Equipment (UE).

Preferably, the device for transmitting downlink control information is an evolved NodeB (eNB).

Figure 4:
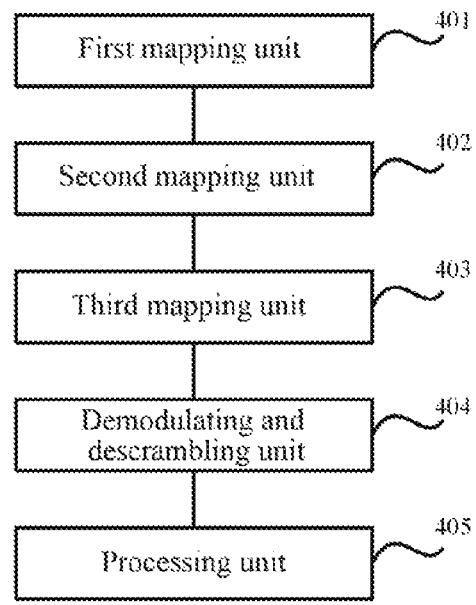
FIG. 4 is a structural diagram of another device for transmitting downlink control information according to an embodiment of the invention.

As illustrated in FIG. 4, an embodiment of the invention provides a device for transmitting downlink control information, which includes:

A first mapping unit 401 configured to receive a signal transmitted from the network side over physical antennas and to map the signal onto Demodulation Reference Signal (DMRS) antenna ports to obtain modulated symbols;

A second mapping unit 402 configured to map the modulated symbols on the DMRS antenna ports to v data layers, where v is an integer more than or equal to 1;

A third mapping unit 403 configured to map the modulated symbols on the v data layers to a sequence of modulated symbols;

A demodulating and descrambling unit 404 configured to demodulate and descramble the sequence of modulated symbols sequentially to obtain downlink control information codewords; and A processing unit 405 configured to process the downlink control information codewords to obtain the downlink control information.

Preferably the device for transmitting downlink control information in the embodiment of the invention is a User Equipment (UE).

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore the invention can be embodied in the form of a computer program product embodied in one or more computer useable storage mediums (including but not limited to a disk memory, a CD-ROM, an optical memory, etc.) in which computer useable program codes are processed.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of other programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable data processing device provide steps for performing the functions specified in the flow(s) of the flow chart and/or the block(s) of the block diagram.

Although the preferred embodiments of the invention have been described, those skilled in the art benefiting from the underlying inventive concept can make additional modifications and variations to these embodiments. Therefore the appended claims are intended to be construed as encompassing the preferred embodiments and all the modifications and variations coming into the scope of the invention.

Evidently, those skilled in the art can make various modifications and variations to the invention without departing from the scope of the invention. Thus the invention is also intended to encompass these modifications and variations thereto so long as the modifications and variations come into the scope of the claims appended to the invention and their equivalents.

The invention claimed is:

1. A method for transmitting downlink control information, comprising:
processing the downlink control information to generate downlink control information codewords;
scrambling and modulating the downlink control information codewords sequentially to generate a sequence of modulated symbols;
mapping the sequence of modulated symbols onto v data layers, wherein v is an integer more than or equal to 1;
mapping the modulated symbols on the v data layers to Demodulation Reference Signal, DMRS, antenna ports; and
mapping the modulated symbols on the DMRS antenna ports onto physical antennas and sending to a User Equipment, UE,
wherein mapping the sequence of modulated symbols onto the v data layers comprises:
mapping the sequence of modulated symbols onto the v data layers in a preset first mapping scheme, wherein numbers of modulated symbols at each data layer are equal,
wherein the sequence of modulated symbols is mapped onto the v data layers in the following mapping scheme:

$$\begin{cases} x^{(0)}(j) = d(v \times j) \\ M \\ x^{(v-1)}(j) = d(v \times j + v - 1), \end{cases}$$

wherein $x^{(l)}(j)$ is a modulated symbol at the l-th data layer, l=0, ..., v−1, j=0, ..., $M_{symbol}^{layer}$−1, $M_{symbol}^{layer}$ represents the total number of modulated symbols at each data layer, d(k) is the sequence of modulated symbols, k=0, ..., $M_{symbol}$−1, $M_{symbol}$ is the total number of modulated symbols in the sequence of modulated symbols, and $M_{symbol}^{layer} = M_{symbol}/v$.

2. The method according to claim 1, wherein:
the number v of data layers for use in mapping is determined according to a channel condition of the UE, wherein v is determined to be no more than the number of DMRS antenna ports supported by the UE.

3. The method according to claim 1, wherein mapping the modulated symbols on the DMRS antenna ports onto the physical antennas comprises:
selecting a pre-coding matrix W according to a channel condition of the UE; and
mapping the modulated symbols on the DRMS antenna ports onto the physical antennas in the following mapping scheme:

$$\tilde{y}(j) = W \cdot y(j),$$

wherein $\tilde{y}(j)$ is a signal on a physical antenna, and y(j) is a modulated symbol on a DMRS antenna port.

4. The method according to claim 1, wherein mapping the modulated symbols on the v data layers to the DMRS antenna ports comprises:
mapping the modulated symbols on the v data layers onto the DMRS antenna ports in a preset second mapping scheme according to the number v of data layers and the number of DMRS antenna ports.

5. The method according to claim 4, wherein the number v of data layers is equal to the number of DMRS antenna ports, and the modulated symbols on the v data layers are mapped to the DMRS antenna ports in the scheme that the data layers correspond to the DMRS antenna ports in a one-to-one manner.

6. The method according to claim 1, wherein processing the downlink control information to generate the downlink control information codewords comprises:
adding a Cyclic Redundancy Check, CRC, code into the downlink control information; and
performing channel encoding and rate matching on the downlink control information with the CRC code added thereto to generate the downlink control information codewords.

7. The method according to claim 1, wherein scrambling the downlink control information codewords comprises:
scrambling the downlink control information codewords at a bit level by a pseudorandom sequence c(i) as follows:
$\tilde{b}(i) = (b(i) + c(i)) \bmod 2$, wherein i=0, ..., $M_{bit}$−1, b(i) is a downlink control information codeword, and $M_{bit}$ is the total number of downlink control information codewords.

8. The method according to claim 1, wherein modulating the scrambled downlink control information codewords comprises:
determining a modulation scheme according to a channel condition of the UE, and modulating the scrambled downlink control information codewords in the determined modulation scheme.

9. A method for transmitting downlink control information, comprising:

receiving a signal transmitted from the network side over physical antennas and mapping the signal onto Demodulation Reference Signal, DMRS, antenna ports to obtain modulated symbols;

mapping the modulated symbols on the DMRS antenna ports to v data layers, wherein v is an integer more than or equal to 1;

mapping the modulated symbols on the v data layers to a sequence of modulated symbols;

demodulating and descrambling the sequence of modulated symbols sequentially to obtain downlink control information codewords; and processing the downlink control information codewords to obtain the downlink control information, wherein mapping the modulated symbols on the v data layers to a sequence of modulated symbols comprises:

mapping the modulated symbols on the v data layers to a sequence of modulated symbols in a preset first mapping scheme, wherein numbers of modulated symbols at each data layer are equal, and the preset first mapping scheme is the following mapping scheme:

$$\begin{cases} x^{(0)}(j) = d(v \times j) \\ M \\ x^{(v-1)}(j) = d(v \times j + v - 1), \end{cases}$$

wherein $x^{(l)}(j)$ is a modulated symbol at the l-th data layer, $l=0, \ldots, v-1$, $j=0, \ldots, M_{symbol}^{layer}-1$, $M_{symbol}^{layer}$ represents the total number of modulated symbols at each data layer, $d(k)$ is the sequence of modulated symbols, $k=0, \ldots M_{symbol}-1$, $M_{symbol}$ is the total number of modulated symbols in the sequence of modulated symbols, and $M_{symbol}^{layer}=M_{symbol}/v$.

10. A device for transmitting downlink control information, comprising:

a preprocessing unit configured to process the downlink control information to generate downlink control information codewords;

a scrambling and modulating unit configured to scramble and modulate the downlink control information codewords sequentially to generate a sequence of modulated symbols;

a first mapping unit configured to map the sequence of modulated symbols onto v data layers, wherein v is an integer more than or equal to 1;

a second mapping unit configured to map the modulated symbols on the v data layers to Demodulation Reference Signal, DMRS, antenna ports; and a third mapping unit configured to map the modulated symbols on the DMRS antenna ports onto physical antennas and to send to a User Equipment, UE, wherein the first mapping unit is configured to map the sequence of modulated symbols onto the v data layers in a preset first mapping scheme, wherein numbers of modulated symbols at each data layer are equal, and the preset first mapping scheme is the following mapping scheme:

$$\begin{cases} x^{(0)}(j) = d(v \times j) \\ M \\ x^{(v-1)}(j) = d(v \times j + v - 1), \end{cases}$$

wherein $x^{(l)}(j)$ is a modulated symbol at the l-th data layer, $l=0, \ldots, v-1$, $j=0, \ldots, M_{symbol}^{layer}-1$, $M_{symbol}^{layer}$ represents the total number of modulated symbols at each data layer, $d(k)$ is the sequence of modulated symbols, $k=0, \ldots M_{symbol}-1$, $M_{symbol}$ is the total number of modulated symbols in the sequence of modulated symbols, and $M_{symbol}^{layer}=M_{symbol}/v$.

11. The device according to claim 10, wherein the first mapping unit is further configured to determine the number v of data layers for use in mapping according to a channel condition of the UE, wherein v is determined to be no more than the number of DMRS antenna ports supported by the UE.

12. The device according to claim 10, wherein the third mapping unit maps the modulated symbols on the DMRS antenna ports onto the physical antennas comprises:

selecting a pre-coding matrix W according to a channel condition of the UE; and mapping the modulated symbols on the DRMS antenna ports onto the physical antennas in the following mapping scheme:

$\tilde{e}(j)=W \cdot y(j)$, wherein $\tilde{e}(j)$ is a signal on a physical antenna, and $y(j)$ is a modulated symbol on a DMRS antenna port.

13. The device according to claim 10, wherein the second mapping unit maps the modulated symbols on the v data layers to the DMRS antenna ports comprises:

mapping the modulated symbols on the v data layers onto the DMRS antenna ports in a preset second mapping scheme according to the number v of data layers and the number of DMRS antenna ports.

14. The device according to claim 13, wherein the number v of data layers is equal to the number of DMRS antenna ports, and the second mapping unit is further configured to map the modulated symbols on the v data layers to the DMRS antenna ports in the scheme that the data layers correspond to the DMRS antenna ports in a one-to-one manner.

15. The device according to claim 10, wherein the preprocessing unit processes the downlink control information to generate the downlink control information codewords comprises:

adding a Cyclic Redundancy Check, CRC, code into the downlink control information; and performing channel encoding and rate matching on the downlink control information with the CRC code added thereto to generate the downlink control information codewords.

16. The device according to claim 10, wherein the scrambling and modulating unit scrambles the downlink control information codewords comprises:

scrambling the downlink control information codewords at a bit level by a pseudorandom sequence $c(i)$ as follows: $\tilde{b}(i)=(b(i)+c(i)) \mod 2$, wherein $i=0, \ldots, M_{bit}-1$, $b(i)$ is a downlink control information codeword, and $M_{bit}$ is the total number of downlink control information codewords.

* * * * *